(12) United States Patent
Kuehner et al.

(10) Patent No.: US 11,935,427 B2
(45) Date of Patent: Mar. 19, 2024

(54) DRIVER TRAINING SYSTEM EMPLOYING AN UNMANNED AERIAL VEHICLE

(71) Applicant: Toyota Research Institute, Inc., Los Altos, CA (US)

(72) Inventors: Manuel Ludwig Kuehner, Mountain View, CA (US); Hiroshi Yasuda, San Francisco, CA (US); Alexander R. Green, Redwood City, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 43 days.

(21) Appl. No.: 17/730,304

(22) Filed: Apr. 27, 2022

(65) Prior Publication Data

US 2023/0351917 A1 Nov. 2, 2023

(51) Int. Cl.
*B64D 47/00* (2006.01)
*B64C 39/02* (2023.01)
*B64D 47/02* (2006.01)
*G09B 19/16* (2006.01)
*B64U 101/00* (2023.01)

(52) U.S. Cl.
CPC .......... *G09B 19/167* (2013.01); *B64C 39/024* (2013.01); *B64D 47/02* (2013.01); *B64U 2101/00* (2023.01)

(58) Field of Classification Search
CPC .... G09B 19/167; B64C 39/024; B64D 47/02; B64U 2101/00
See application file for complete search history.

(56) References Cited

U.S. PATENT DOCUMENTS

| 10,037,711 | B2 | 7/2018 | Chauncey et al. |
| 10,414,407 | B1 | 9/2019 | Slusar |
| 10,600,326 | B2 | 3/2020 | Kim et al. |
| 2019/0161190 | A1* | 5/2019 | Gil ....................... B65G 1/0435 |

FOREIGN PATENT DOCUMENTS

CN 107589752 A 1/2018

OTHER PUBLICATIONS

Garmin Catalyst™ Driving Performance Optimizer, Retrieved from: https://www.garmin.com/en-US/p/690726, Accessed on Nov. 12, 2021.

* cited by examiner

*Primary Examiner* — Robert P Bullington
(74) *Attorney, Agent, or Firm* — Christopher G. Darrow; Darrow Mustafa PC

(57) ABSTRACT

A driver training system includes an unmanned aerial vehicle (UAV) including a processor and a memory communicably coupled to the processor and storing a UAV control module including computer-readable instructions that when executed by the processor cause the processor to control operation of a driver training interface operably connected to the UAV to communicate driving instruction information in a manner configured to be perceptible by a human driver in a driver training vehicle following behind the UAV.

20 Claims, 10 Drawing Sheets

DRIVER TRAINING SYSTEM EMPLOYING AN UNMANNED AERIAL VEHICLE

TECHNICAL FIELD

The embodiments disclosed herein relate to systems for training drivers of road vehicles and, more particularly, to a driver training system using one or more autonomous unmanned aerial vehicles to guide and instruct a driver-in-training driving a training vehicle along a test track.

BACKGROUND

Currently, a race car driver-in-training may learn how to drive a race car by driving behind a professional race car driver along a test track. Alternatively, the driver-in-training may learn by having a trained professional race car driver sit in the vehicle with the driver-in-training during traversal of the test track, to provide real-time driving instruction. However, both of these methods require the participation of two human drivers, which puts both the driver-in-training and professional driver/instructor at risk of injury due to accidents.

SUMMARY

In one aspect of the embodiments described herein, a driver training system is provided. The driver training system includes an unmanned aerial vehicle (UAV) having a processor and a memory communicably coupled to the processor and storing a UAV control module including computer-readable instructions that when executed by the processor cause the processor to control operation of a driver training interface operably connected to the UAV to communicate driving instruction information in a manner configured to be perceptible by a human driver in a driver training vehicle following behind the UAV.

In another aspect of the embodiments described herein, a non-transitory computer-readable medium is provided for training a driver to drive a ground vehicle. The medium stores instructions that when executed by a processor cause the processor to, in an unmanned aerial vehicle (UAV) configured to fly along a predetermined flight path extending above a road surface on which the ground vehicle resides, control operation of a driver training interface operably connected to the UAV such that the driver training interface communicates driving instruction information in a manner configured to be perceptible by the driver when the driver is following behind the UAV in the ground vehicle as the UAV flies along the predetermined flight path.

In yet another aspect of the embodiments described herein, a method is provided for training a driver to drive a ground vehicle. The method includes a step of, in an unmanned aerial vehicle (UAV) configured to fly along a predetermined flight path extending above a road surface on which the ground vehicle resides, the UAV having a driver training interface operably connected thereto, controlling operation of the driver training interface to communicate driving instruction information in a manner configured to be perceptible by the driver when the driver is following behind the UAV in the ground vehicle as the UAV flies along the predetermined flight path.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1A:
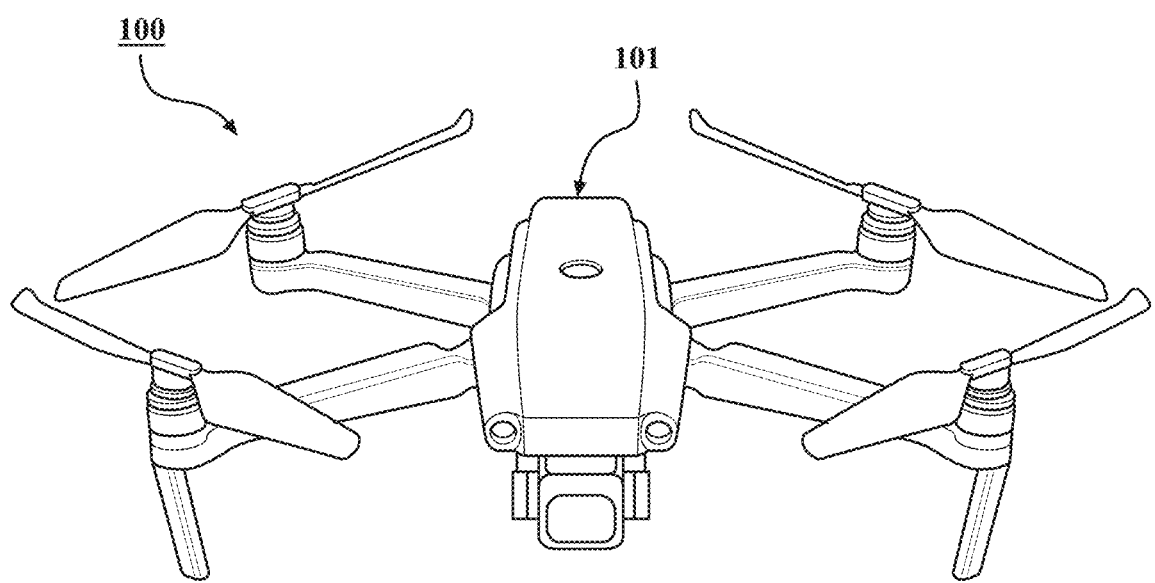
FIG. 1A shows a perspective view of an exemplary UAV incorporated into an embodiment of a driver training system as described herein.

A driver training system includes an unmanned aerial vehicle (UAV) controlled by a UAV control module configured to control operation of a driver training interface operably connected to the UAV to communicate driving instruction information in a manner configured to be perceptible by a human driver-in-training driving a training vehicle following behind the UAV. In some aspects, the driver training interface may include a lighting system structured to simulate operation of a brake light and a rear turn signal of a ground vehicle driving in front of the driver training vehicle. In some aspects, the driver training interface may include a command display configured to convey various types of driving instruction information to the driver-in-training. The UAV control module may also be configured to control operation of the UAV during flight so as to maintain an altitude of the UAV within a predetermined range, and so as to maintain the UAV within a predetermined lead distance in front of the training vehicle while the training vehicle is following the UAV. In certain arrangements, the driver training system may employ multiple UAV's flying in formation so as to mimic aspects of a ground vehicle driving in front of the training vehicle.

Embodiments of the driver training system described herein eliminate the need for a professional human driver in the training process, thereby eliminating the risk of injury to this driver.

It will be appreciated that for simplicity and clarity of illustration, where appropriate, reference numerals may have been repeated among the different figures to indicate corresponding or analogous elements. Also, the discussion outlines numerous specific details to provide a thorough understanding of the embodiments described herein. Those of skill in the art, however, will understand that the embodiments described herein may be practiced using various combinations of these elements.

Described herein are various embodiments of a driver training system (generally designated 100). A "driver training system" may be a system designed to facilitate training of a human driver of a ground vehicle. The driver training system 100 may help train the driver by leading or guiding the driver along a prescribed course (such as a vehicle test track) in a predetermined manner while providing driving instruction information to the driver.

Figure 6:
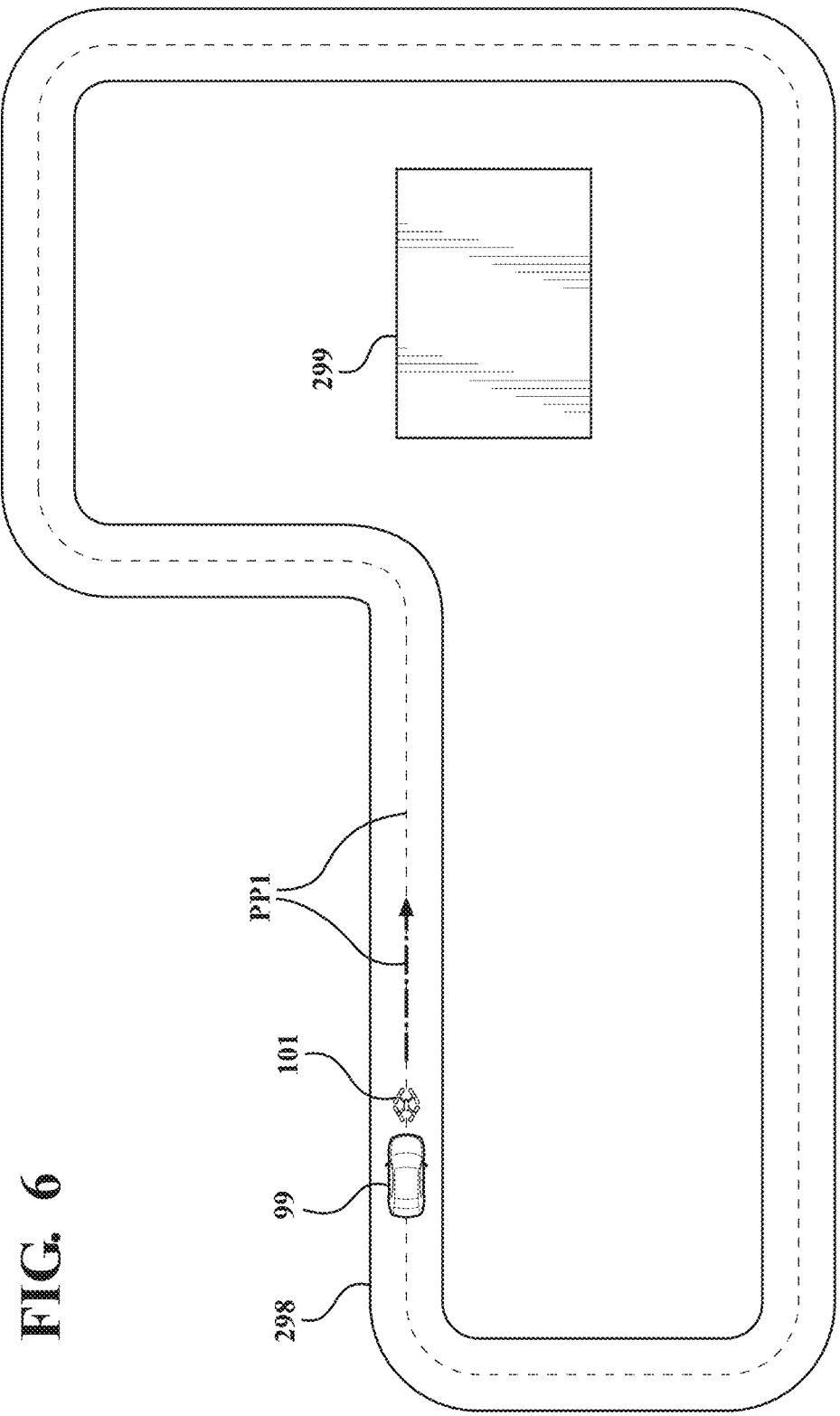
FIG. 6 is a schematic plan view showing an exemplary autonomously controlled UAV moving along a predetermined flight path defined to extend along a vehicle test track.

In one or more arrangements, the driver training system 100 may incorporate one or more unmanned aerial vehicles ("UAV's") configured for autonomous flight and other operations. FIG. 6 shows an exemplary autonomously controlled UAV 101 moving along a predetermined flight path PP1 defined to extend along a vehicle test track 298. The UAV 101 is controlled to move along the flight path PP1 in a manner enabling a human driver in a driver training vehicle 99 to observe and follow the UAV 101 along the path. A driver training vehicle 99 may be a vehicle manually driven by a human driver-in-training and which follows the UAV 101 along the test track 298 or other prescribed route for driver training purposes during a driver training event. A "driver training event" may be a traversal of the test track 298 by a UAV where the UAV is followed by a driver training vehicle being driven by a human driver-in-training.

The test track 298 may include a central control facility 299 configured to communicate control commands and/or other information to certain embodiments of the UAV and/or the vehicle 99 in certain situations. The driver training vehicle 99 can include an input system (not shown). An "input system" includes any device, component, system, element or arrangement or groups thereof that enable information/data to be entered into a machine. For example, the input system may include a keypad, a touch screen or other interactive display, a voice-recognition system and/or any other device or system which facilitates communications between the driver of the training vehicle and the training vehicle. In certain embodiments, the input system 130 may enable communications with the UAV 101 leading the training vehicle 99. The driver training vehicle 99 can also include an output system (not shown). An "output system" includes any device, component, or arrangement or groups thereof that enable information/data to be presented to an occupant of the driver training vehicle 99.

"Driving instruction information" may be information directed to instructing the driver-in-training on how to operate the driver training vehicle 99 during the driver training event. The driving instruction information may be communicated by the vehicle output system in any human-perceptible format (for example, visual, audible, tactile, or any combination of these). The training vehicle output system may be configured to generate a perceptible display of any type of information displayed by the command display 116-3 and also additional types of information. For example, the vehicle output system may be configured to communicate an ideal current speed of the driver training vehicle 99 at any test track location corresponding to a current spatial location of the UAV 101 along its flight path. The vehicle output system may be configured to communicate an ideal training vehicle speed at which to execute an upcoming turn. The vehicle output system may be configured to communicate a countdown (in seconds) until a time when the training vehicle brakes should be applied by the driver-in-training. Other information may also be communicated by the output system. In one or more arrangements, information communicated via the training vehicle output system may be received from the UAV 101. The UAV control module 160 may be configured to control operation of the training vehicle output system during the driver training event so as to display the various types of information described above.

Figure 1B:
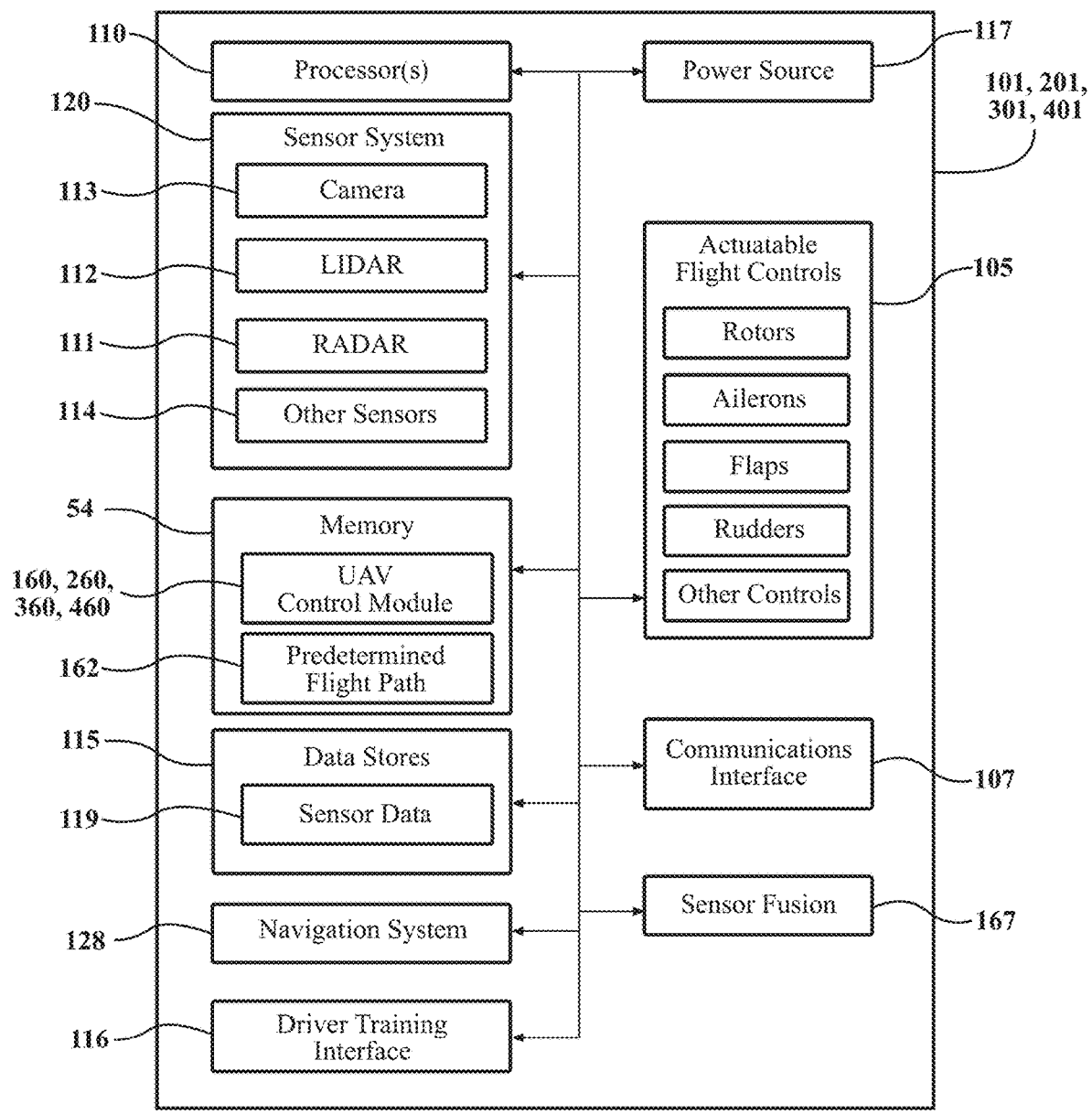
FIG. 1B shows a block schematic diagram of the UAV of FIG. 1A.

One example of a driver training system 100 including an UAV 101 is illustrated in FIGS. 1A and 1B. FIG. 1A shows a perspective view of an exemplary UAV 101 in accordance with an embodiment described herein. The UAV 101 may be a quadricopter (as shown in FIG. 1A) or any other similar type of air travel-capable model. Further description on how the UAV 101 is operated will be provided in more detail below. Unless otherwise noted, the following descriptions of the features, functions, and capabilities of the UAV 101 will apply to other UAV's 201, 301, 401 which may be incorporated into additional embodiments of the driver training system as described herein.

FIG. 1B shows a block schematic diagram of the UAV 101 of FIG. 1A. As shown in FIG. 1B, the UAV 101 includes various elements. It will be understood that in various embodiments it may not be necessary for the UAV 101 to have all of the elements shown in FIG. 1B. The UAV 101 can have any combination of the various elements shown in FIG. 1B. Further, the UAV 101 can have additional elements to those shown in FIG. 1B. In some arrangements, the UAV 101 may be implemented without one or more of the elements shown in FIG. 1B. While the various elements are shown as being located within the UAV 101 in FIG. 1B, it will be understood that one or more of these elements can be located external to the UAV 101.

In one or more embodiments, the UAV 101 is an autonomous vehicle. As used herein, "autonomous vehicle" refers to a vehicle that can operate in an autonomous mode. "Autonomous mode" refers to take-off, landing, navigation and/or maneuvering of the UAV 101 along a predetermined flight path of the UAV using one or more processors to control the UAV 101 with minimal or no input from a human controller. In one or more embodiments, the UAV 101 is highly automated or completely automated. In one or more arrangements, the UAV 101 is configured with one or more semi-autonomous operational modes in which one or more processor(s) execute computer-readable instructions to perform a portion of the navigation and/or maneuvering of the UAV along one or more portions of a flight path, and a human operator (i.e., pilot) provides inputs to the UAV to perform at least a portion of the navigation and/or maneuvering of the UAV 101 along the flight path. In addition, certain embodiments of the UAV 101 may be configured with a manual operational mode in which all of or a majority of the navigation and/or maneuvering of the UAV along the flight path is performed according to inputs received from a human controller. The semi-autonomous and manual operational modes may be employed for UAV training or programming purposes. The manual operational mode may also be employed for UAV testing and for emergency control of the UAV.

Referring to FIG. 1B, the UAV 101 can include one or more processors 110. In one or more arrangements, the processor(s) 110 can be a main processor(s) of the UAV 101. For instance, the processor(s) 110 can be an electronic control unit (ECU). The UAV 101 can also include one or more data stores 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operably connected to the processor(s) 110 for use thereby. The term "operably connected," as used throughout this description, can include direct or indirect connections, including connections without direct physical contact.

The data store(s) 115 can include sensor data 119. In this context, "sensor data" means any information about the sensors that the UAV 101 is equipped with, including the capabilities and other information about such sensors. As will be explained below, the UAV 101 can include a sensor system 120. The sensor data 119 can relate to one or more sensors of the sensor system 120. As an example, in one or more arrangements, the sensor data 119 can include information on the radar sensors 111 of the sensor system 120.

As noted above, the UAV 101 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process. In arrangements in which the sensor system 120 includes a plurality of sensors, the sensors can work independently from each other. Alternatively, two or more of the sensors can work in combination with each other. In such cases, the two or more sensors can form a sensor network. The sensor system 120 and/or the one or more sensors can be operably connected to the processor(s) 110, the data store(s) 115, and/or other element(s) of the UAV 101 (including any of the elements shown in FIG. 1B).

The sensor system 120 may include any sensors suitable for and/or required to perform any of the data acquisition and/or UAV control operations contemplated herein. Various examples of different types of sensors are described herein. However, it will be understood that the embodiments are not limited to the particular sensors described and that, for purposes of operating the vehicle, sensors other than those shown in FIG. 1B may be incorporated into the UAV 101. Sensors of sensor system 120 may be communicably coupled to the various systems and components of the UAV 101. For example, the sensors may be operably connected to data stores 115 and processor(s) 110, for storage and processing of sensor data relating to an external environment of the vehicle.

In one or more arrangements, sensors of the sensor system 120 can be configured to detect, quantify and/or sense objects in at least a portion of the external environment of the UAV 101 and/or information/data about such objects. Such objects may be stationary objects and/or dynamic objects. The sensors can be configured to detect, measure, quantify, classify and/or sense other things in the external environment of the UAV 101. As an example, the sensors system 120 can include one or more radar sensors 111, one or more LIDAR sensors 112, one or more cameras 113, and/or other sensors (generally designated 114).

Radar sensors 111 and/or LIDAR sensors 112 may be configured to determine an altitude of the UAV above a reference surface such as a ground surface on which the driver training vehicle 99 resides. The UAV-mounted sensors 120 may also be configured to determine a position of the driver training vehicle 99 relative to the UAV 101 and to determine a position of the UAV relative to the driver training vehicle. Other sensors 114 may include, for example, flight control sensors configured to detect statuses of the actuatable flight controls 105, so that the flight controls may be adjusted responsive to control commands from a UAV control module 160 to direct the UAV 101 along its predetermined flight path. Other sensors 114 may also include UAV speed sensors configured for determining a flying speed of the UAV. Data from the sensor system 120 may be used by the UAV control module 160 in generating control commands for guiding the UAV 101 along its predetermined flight path.

Referring again to FIG. 1B, a sensor fusion module 167 may be an algorithm (or a computing device storing an algorithm) configured to accept data from the sensor system 120 as an input. The data may include, for example, data representing information sensed at the sensors of the sensor system 120. The sensor fusion algorithm 167 may include or be configured to be executed using, for instance, a Kalman filter, Bayesian network, or other algorithm. The sensor fusion algorithm 167 may provide various assessments based on the data from sensor system 120. Depending upon the embodiment, the assessments may include evaluations of individual objects and/or features in the environment of UAV 101, evaluations of particular situations, and/or evaluations of possible impacts based on the particular situation. Other assessments are possible.

The navigation system 128 can include one or more devices, applications, and/or combinations thereof configured to operate in conjunction with the UAV control module 160 to guide and track the UAV 101 along a predetermined flight path of the UAV. The navigation system 128 can include one or more devices, applications, and/or combinations thereof, now known or later developed, configured to determine the geographic location of the UAV 101 with respect to a predetermined flight path of the UAV 101. The navigation system 128 may be configured to determine (or aid in determining) a flight path for a UAV based on information such as a predetermined flight path of another UAV. In some arrangements, the flight path determined for the UAV may be based on a requirement for the UAV to maintain a predetermined spatial relationship with respect to another UAV. In examples, the navigation system 128 can include a global positioning system, a local positioning system or a geolocation system.

A wireless communications interface 107 may be configured to enable and/or facilitate communication between the UAV 101 and other vehicles and/or entities, such as other UAV's, ground vehicles (such as driver training vehicle 99), a test track central control facility 299 (FIG. 6), and other entities external to the UAV 101. Wireless communications interface 107 may also be configured to enable communication between internal components and/or systems of the UAV, if needed. Information such as sensor data, current values of UAV operating parameters, navigational and map information and other types of information may be transmitted and received via the communications interface 107. Wireless communications interface 107 may incorporate or be in communication with any network interfaces needed for communication with any extra-vehicular entities and/or networks.

Referring to FIG. 1B, actuatable flight controls 105 may include systems and elements operable to affect aspects of UAV operations (such as altitude and direction) during flight responsive to control commands from an associated UAV control module and/or from other command sources. Such systems and elements may include rotors, ailerons, flaps, rudders, stabilizers, and other systems and controls, depending on the design of the UAV.

The UAV 101 may include a power source 117 configured for powering the flight controls, sensors, communications, and other UAV systems. A suitable power source may be a rechargeable lithium-ion battery, a rechargeable Ni-Mh battery, an alkaline cell, or other device configured for portable energy storage for use in an electronic device.

The UAV 101 can include one or more actuators (not shown). The actuators can be any element or combination of elements operable to modify, adjust and/or alter one or more of the systems or components of the UAV 101 responsive to receiving signals or other inputs from the processor(s) 110, any of the modules stored in memory 54, and/or any other UAV components or systems. Any suitable actuator can be used. For instance, the one or more actuators can include motors, pneumatic actuators, hydraulic pistons, relays, solenoids, and/or piezoelectric actuators, just to name a few possibilities. For example, one or more of the actuators may be configured to control the orientation angles of UAV ailerons, flaps, and/or other flight control surfaces.

In one or more arrangements, a memory 54 of the UAV 101 may store various modules (such as UAV control module 160) and other information used for controlling operations the UAV 101. The memory 54 is a random-access memory (RAM), read-only memory (ROM), a hard-disk drive, a flash memory, or other suitable memory for storing the module 160 and other information. As described below, the module 160 stores computer-readable instructions that, when executed by the processor 110, cause the UAV 101 to perform the various functions disclosed herein.

In one or more arrangements, the driver training system 100 may include a driver training interface (generally designated 116) operably connected to the UAV 101. A "driver training interface" may be a device or system configured to communicate driving instruction information in a manner configured to be perceptible by a driver-in-training who is driving a training vehicle 99 following behind the UAV 101. The term "communicate" as applied to the driving instruction information may mean to broadcast, transmit, display, or otherwise make the driving instruction information available in a perceptible form. The term "perceptible" as used herein may mean capable of being perceived by one or more human senses (e.g., sight, hearing, etc.). The driving instruction information may be presented in any human-perceptible format (for example, visual, audible, or any combination of these). For example, the driving instruction information may be in the form of activated signal lights or various forms of commands conveyed to a driver-in-training via signs or messages exterior of the driver training vehicle 99, or via an output system (not shown) incorporated into the driver training vehicle 99.

Figure 2A:
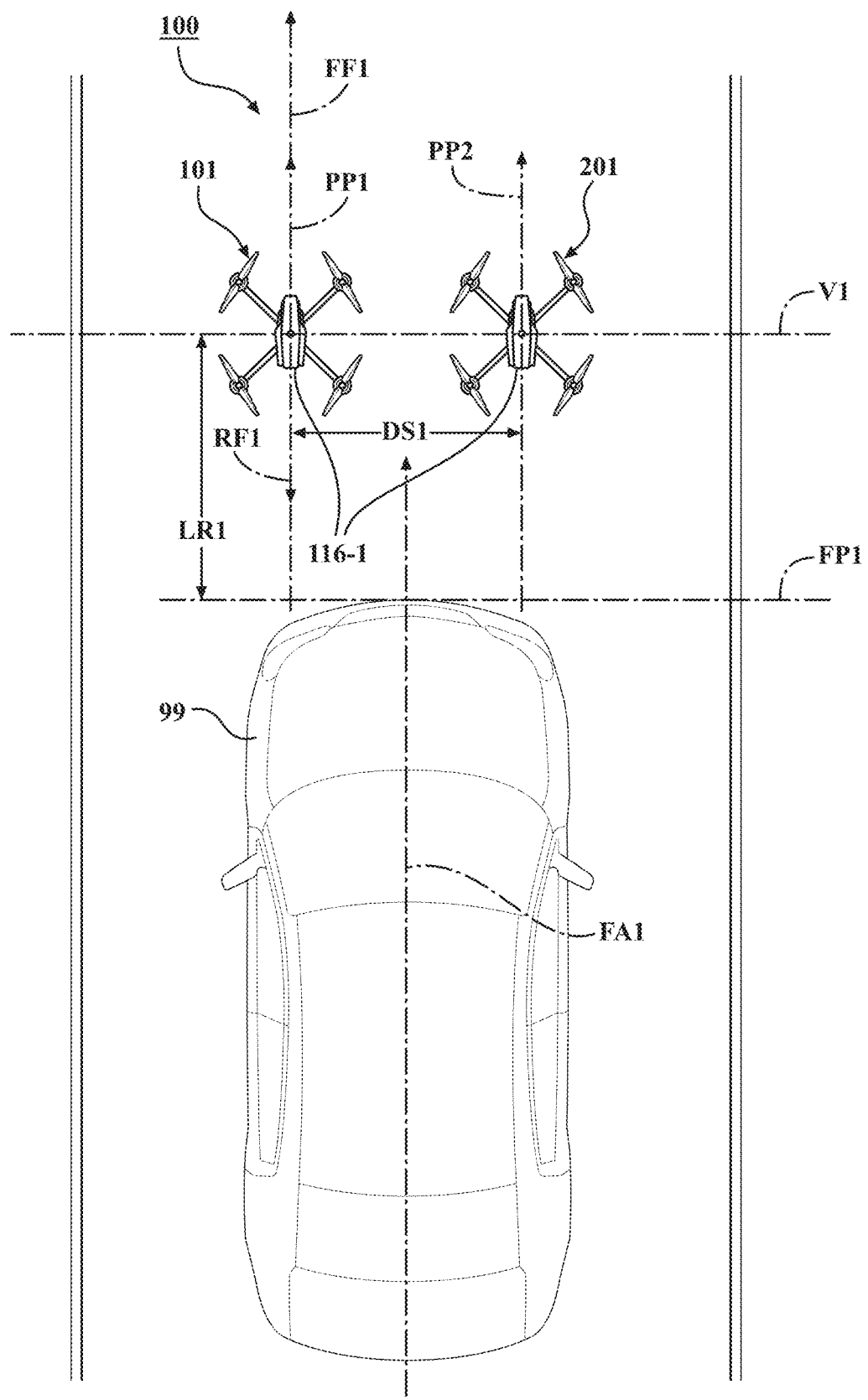
FIG. 2A is a schematic plan view of an embodiment of the driver training system incorporating multiple UAV's and flying above a road surface, with a driver training vehicle following the driver training system.

In addition, referring to FIG. 2A, a front facing direction FF1 of the UAV 101 may be defined as extending either along or tangent to a predetermined flight path PP1 of the UAV 101. A rear facing direction RF1 of the UAV 101 may be a direction opposite the front facing direction FF1. The driver training interface 116 may operably connected to the UAV 101 so as to face in the rear facing direction RF1, toward a driver training vehicle 99 following behind the UAV, so that driving instruction information provided by the driver training interface 116 remains visible to the driver training vehicle 99 while the vehicle follows the UAV 101.

Figure 2B:
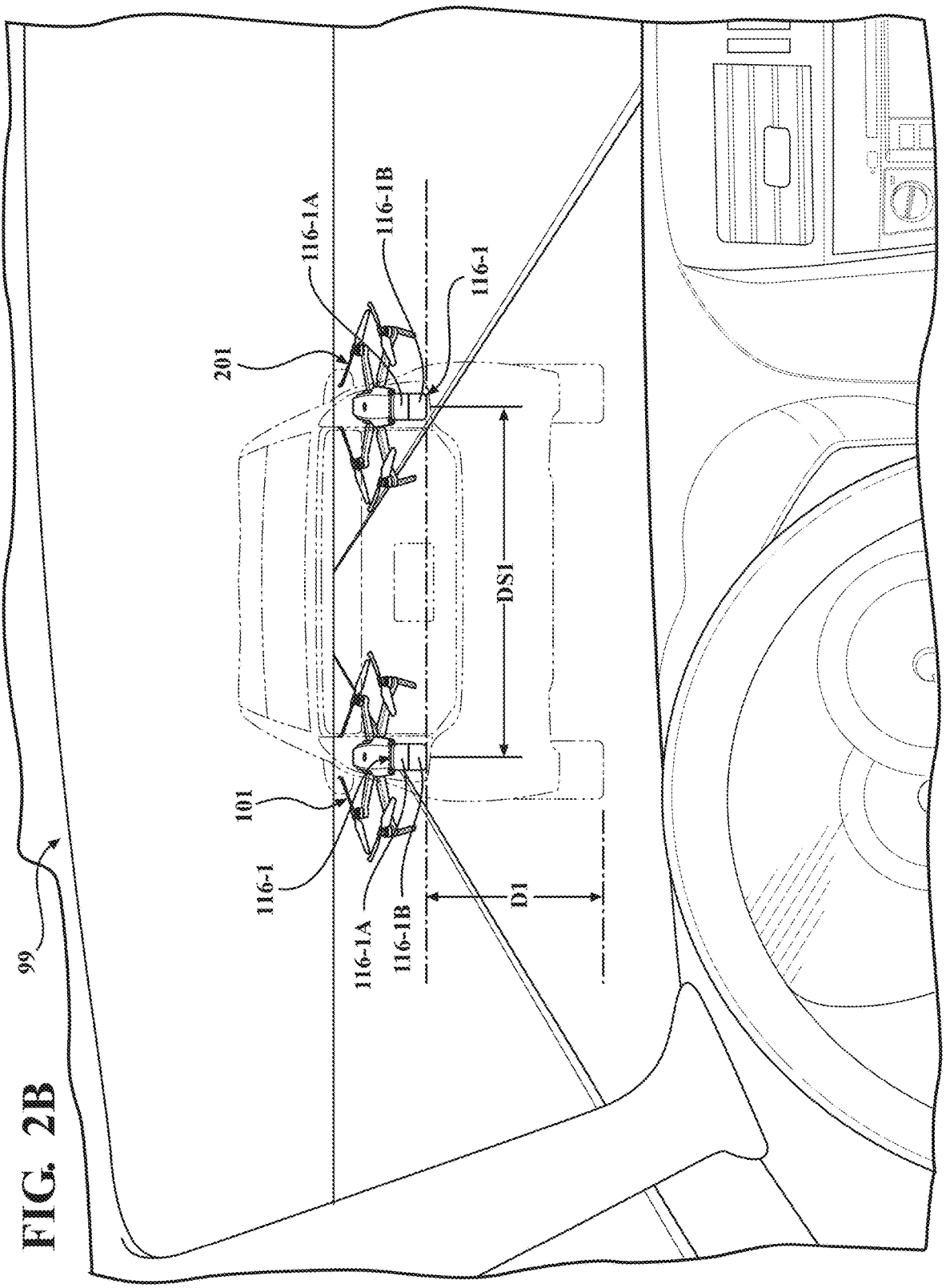
FIG. 2B is a schematic perspective view of the driver training system embodiment of FIG. 2A, seen from an occupant compartment of the driver training vehicle.

Referring to FIGS. 2A-2B, in one or more arrangements, the driver training interface includes a lighting system 116-1 including a first light 116-1A structured to simulate operation of a brake light and a second light 116-1B structured to simulate operation of a rear turn signal of a ground passenger vehicle, responsive to one or more control commands. As described herein, a UAV incorporating the lighting system 116-1 may be controlled in flight so that the lighting system 116-1 occupies and maintains the same location (with respect to the driver training vehicle 99) that a brake light and rear turn signal of a conventional ground vehicle may occupy if the conventional ground vehicle was driving in front of the driver training vehicle 99.

FIGS. 2A-2B show a pair of UAV's 101, 201 flying in front of a driver training vehicle 99. The UAV's 101, 201 may be controlled by respective UAV control modules 160, 260 (FIG. 1B, described in greater de tail herein) to fly in a formation in which they remain spaced apart a distance DS1 during flight. Spacing apart the respective lighting systems 116-1 of the UAV's 101, 201 as shown acts to simulate the positioning of right and left brake lights (respective ones of lights 116-1A) and rear turn signals (respective ones of lights 116-1B) of a conventional ground vehicle driving in front of the driver training vehicle 99. As the driver training vehicle 99 follows the UAV 101 along the test track, operation of the lighting systems 116-1 may be controlled by UAV control module 160 (of UAV 101) and second UAV control module 260 (of UAV 201) to operate the simulated brake signals and turn signals as needed for driver training purposes.

Figure 3A:
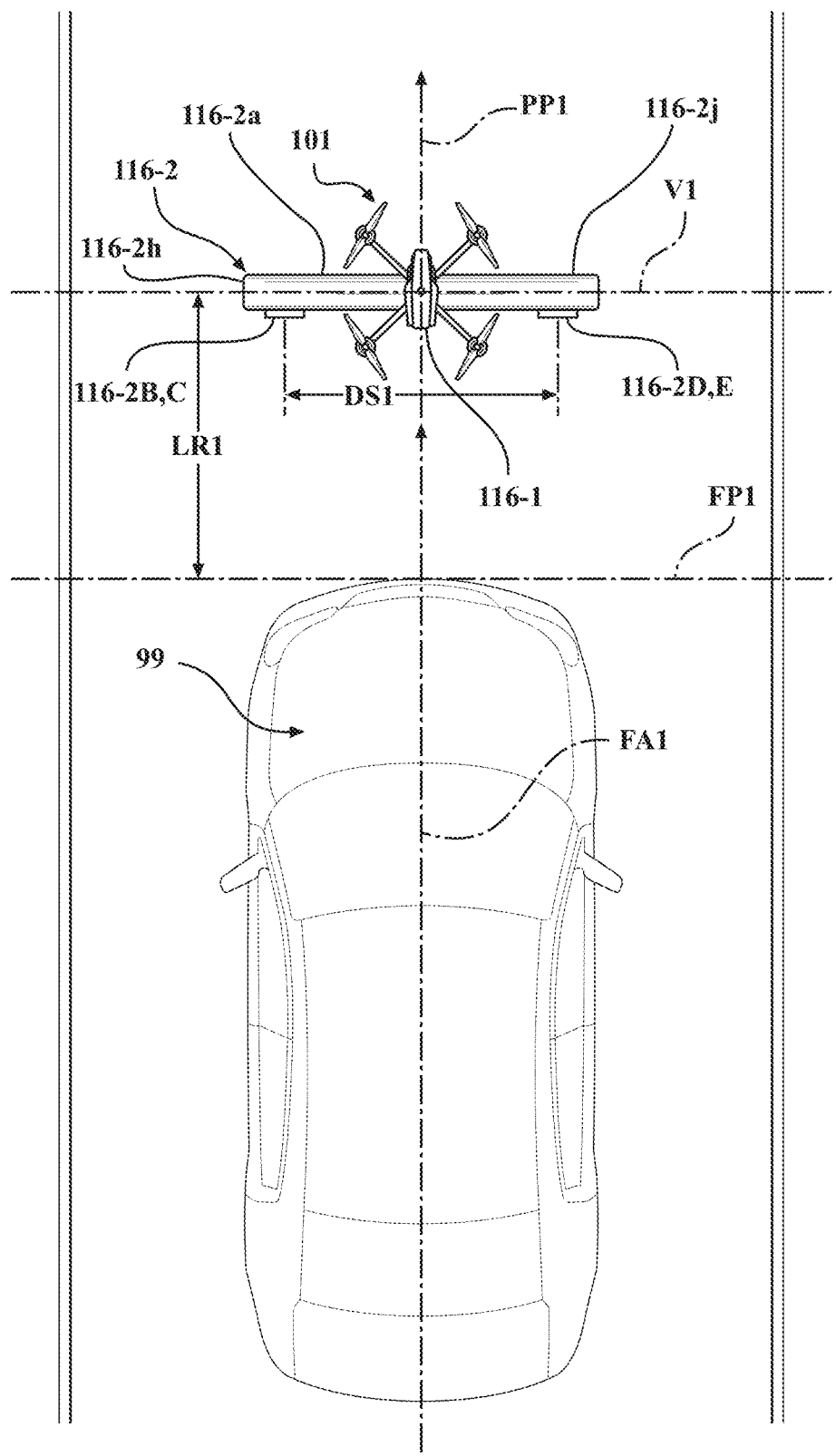
FIG. 3A is a schematic plan view of another embodiment of the driver training system incorporating a single UAV and flying above a road surface, with a driver training vehicle following the driver training system.
Figure 3B:
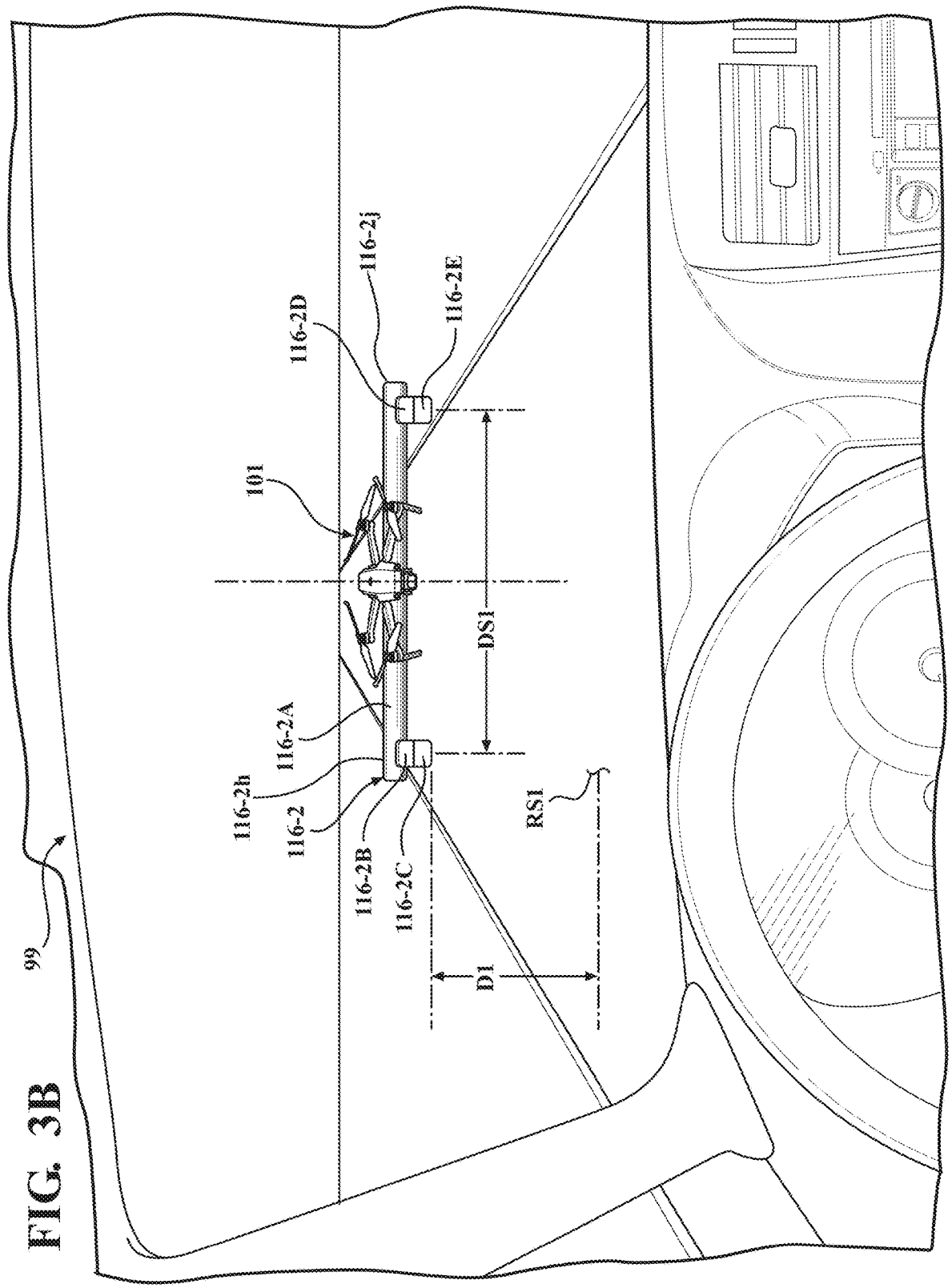
FIG. 3B is a schematic perspective view of the driver training system embodiment of FIG. 3A, seen from an occupant compartment of the driver training vehicle.

Referring now to FIGS. 3A-3B, in some arrangements, the driver training interface is in the form of a rear light carrier 116-2 attached to the UAV 101. The rear light carrier 116-2 may have an elongated housing 116-2a including opposite first and second ends 116-2h, 116-2j, respectively, and a lighting system similar to that shown in FIGS. 2A-2B positioned at or near each end of the housing. The first end lighting system may include a simulated brake light 116-2B and a simulated turn signal 116-2C, and the second end lighting system may include a simulated brake light 116-2D and a simulated turn signal 116-2E. The first and second end lighting systems may be spaced apart a distance DS1 along the housing 116-2a so as to simulate the positioning of right and left brake lights and rear turn signals of a conventional ground vehicle. As the driver training vehicle 99 follows the UAV 101 along the test track, operation of the lighting systems may be controlled by a UAV control module (such as control module 160 described in greater detail herein) of the UAV 101 to activate brake signals and turn signals as needed for driver training purposes. Housing 116-2a may also include a power source (not shown) such as a battery for powering the first and second end lighting systems, a communications interface (not shown) configured to enable wired or wireless communication with the UAV control module 160, and other elements as required.

Figure 5:
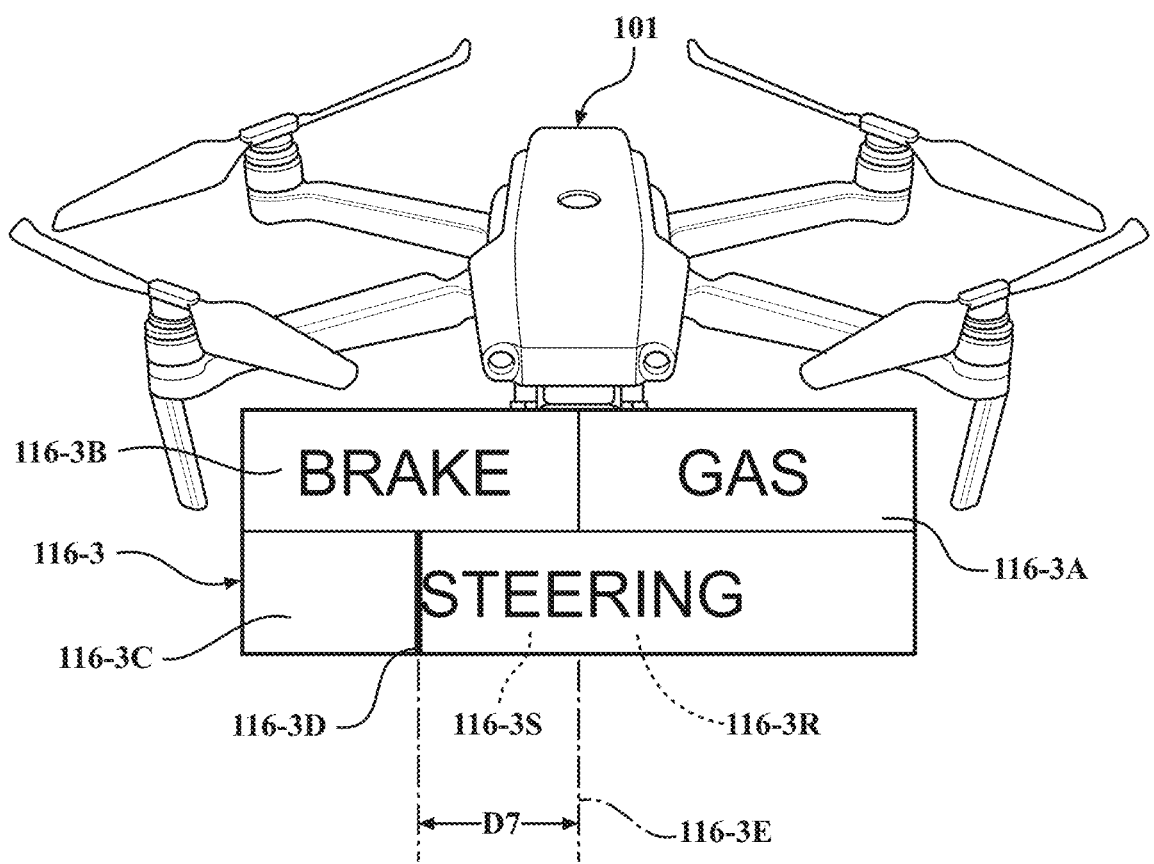
FIG. 5 is a schematic rear view of an embodiment of the driver training system including a single UAV with a command display operably connected thereto.

Referring to FIG. 5, in other arrangements, the driver training interface includes a command display 116-3. The command display 116-3 may be configured to display various commands, each of which may be highlighted, illuminated, or otherwise activated as needed to convey to the driver-in-training a need to execute the command. FIG. 5 shows a schematic rear view of the UAV 101 with the command display 116-3 oriented as it would be when facing toward the following driver training vehicle 99.

In the example shown in FIG. 5, the command display 116-3 includes an accelerator or "gas" portion 116-3A configured to provide a visual indication of a need to operate an accelerator pedal of the training vehicle 99. In such embodiments, the UAV control module 160 may include computer-readable instructions that when executed by the processor(s) 110 cause the processor(s) to control operation of the command display 116-3 to illuminate the accelerator portion 116-3A responsive to a requirement to accelerate the training vehicle 99. Because the UAV 101 may be controlled so as to fly in a relatively fixed position with respect to the driver training vehicle 99, the driver-in-training may visually perceive the illuminated accelerator portion 116-3A and operate the vehicle accelerator pedal until the accelerator portion 116-3A is de-illuminated. The UAV control module may be configured to de-illuminate the accelerator portion 116-3A when, for example, the driver training vehicle 99 has accelerated to a speed required for the portion of the test track on which the driver training vehicle is currently driving.

In the example shown in FIG. 5, the command display 116-3 also includes a braking portion 116-3B structured to provide a visual indication of a need to operate a brake of the training vehicle 99. In such embodiments, the UAV control module 160 may include computer-readable instructions that when executed by the processor(s) 110 cause the processor(s) to control operation of the command display 116-3 to illuminate the braking portion 116-3B responsive to a requirement to slow the training vehicle 99. Because the UAV 101 may be controlled so as to fly in a relatively fixed position with respect to the driver training vehicle 99, the driver-in-training may visually perceive the illuminated braking portion 116-3B and operate the vehicle brake pedal until the braking portion 116-3B is de-illuminated. The UAV control module may be configured to de-illuminate the braking portion 116-3B when, for example, the driver training vehicle 99 has decelerated to a speed required for the portion of the test track on which the training vehicle is currently driving.

In the example shown in FIG. 5, the command display 116-3 also includes a steering portion 116-3C structured to provide a visual indication of a need to operate a steering wheel of the training vehicle 99. Responsive to a need to rotate the steering wheel, the UAV control module 160 may include computer-readable instructions that when executed by the processor(s) 110 cause the processor(s) to control operation of the command display 116-3 to display a status bar 116-3D of the steering portion 116-3C at a location spaced apart a distance D7 from a centerline 116-3E of the steering portion and along any of a first side 116-3S and a second side 116-3R of the centerline 116-3E. In addition, a side of the centerline 116-3E along which the status bar 116-3D is displayed may indicate a direction in which the steering wheel is to be turned in order to achieve a desired ground path of the vehicle 99 in accordance with the UAV flight path. For example, in the arrangement shown in FIG. 5, the UAV control module 160 may be configured to control the status bar 116-3D to move to the first side 116-3S of the centerline 116-3E to instruct the driver-in-training to turn the steering wheel toward the driver's left side, and to move the status bar 116-3D to the second side 116-3R of the centerline 116-3E to instruct the driver-in-training to turn the steering wheel toward the driver's right side. As an example, FIG. 5 shows the status bar 116-3D moved to the first side 116-3S of the centerline 116-3E to instruct the driver-in-training to turn the steering wheel toward the driver's left side. Also, the distance D7 of the status bar 116-3D from the centerline 116-3E may be proportional to an angle through which the steering wheel is required to be turned by the driver of the training vehicle 99.

The UAV control module 160 may also be configured to control the status bar 116-3D as the driver turns the steering wheel, to dynamically adjust the status bar position to conform to an amount by which the steering wheel should be turned away from a center position in which the training vehicle 99 is guided in a straight line ahead. For example, as the steering wheel is turned and the vehicle approaches a new desired movement direction, the UAV control module 160 may control the status bar display to move the status bar 116-3D back toward the centerline 116-3E. Seeing this movement of the status bar 116-3D, the driver-in-training may correspondingly turn the steering wheel back toward its center position until the status bar 116-3D aligns with the centerline 116-3E, thereby indicating that the vehicle 99 has reached the new desired movement direction and that the steering wheel should be centered. This mode of displaying a variation of the current vehicle steering direction from the desired ground path of the vehicle may be employed to indicate a need for a relatively large rotation of the steering wheel (e.g., a 90° turn) and also for minor course corrections requiring relatively slight rotational adjustments to the steering wheel. Any of a variety of alternative control methodologies may also be employed.

Alternative arrangements of the command display may be configured to communicate other types of driving instruction information, such as an ideal current speed of the driver training vehicle at any test track location corresponding to a current spatial location of the UAV along its flight path, an ideal training vehicle speed at which to execute an upcoming turn, and/or a countdown (in seconds) until a time when the training vehicle brakes should be applied by the driver-in-training. Other information may also be communicated by the command display.

The UAV 101 can include one or more modules. Each module can be implemented as computer-readable program code that, when executed by processor(s) 110 of the UAV 101, implement one or more of the various control commands described herein. One or more of the modules can be a component of the associated processor(s), or one or more of the modules can be executed on and/or distributed among other processing systems to which the processor(s) is operably connected. The modules can include instructions (e.g., program logic) executable by the one or more processor(s) 110. Alternatively, or in addition, one or more of data store(s) 115 and/or other portions of the UAV 101 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

A UAV control module 160 as described herein may include computer-readable instructions that, when executed by the processor(s) 110, cause the processor(s) to generate control commands for controlling all aspects of operation of the UAV 101. The control commands may be generated responsive to sensor data, navigation information, and/or other information. Embodiments of the UAV 101 may be autonomously controllable by the UAV control module 160 to, for example, fly at a designated altitude above a ground surface on which the training vehicle 99 resides, to fly at a designated distance ahead of the training vehicle 99, to maintain a predetermined position of the UAV 101 relative to the training vehicle 99, and/or to vary from the predetermined flight path of the UAV 101 as needed so as to avoid detected or potential obstacles.

In addition, the UAV control module 160 may be configured to generate, follow, and modify navigational plans; to adjust the UAV predetermined flight path to avoid obstacles responsive to sensor data and other information, and to perform a variety of other UAV control functions. The UAV control module 160 may be configured to operate the UAV actuatable flight controls to effect maneuvering of the UAV to perform the functions described herein and responsive to, for example, stored instructions, analysis of sensor data, and/or control commands received from a source external to the UAV. Alternatively, in certain instances, UAV control commands may be generated from outside the UAV 101 or externally of the UAV, and then transmitted to the UAV, for example, from another UAV and/or from an external control station. The externally-generated control commands may then be implemented by processor(s) 110.

Embodiments of the UAV control module 160 may include computer-readable instructions that when executed by the processor(s) 110 cause the processor(s) to control operation of the UAV 101 so as to direct the UAV along a predetermined flight path PP1 of the UAV 101. A "predetermined flight path" of the UAV may be a line or path defined by connecting a sequence of spatial coordinates or positions (including altitudes) through which the UAV is to pass during a driver training event.

The predetermined flight path PP1 of the UAV may be determined using any suitable method or methods. In one or more arrangements, the predetermined flight path PP1 may be determined using information gathered during a programming flight of the UAV 101 along the test track. A predetermined flight path PP1 of the UAV 101 may be configured so that the UAV autonomously mimics all of the speed changes, direction changes, and other operations that a ground vehicle being driven by a professional driver and followed by the driver training vehicle would perform during a driver training event. During a UAV programming flight, the UAV 101 may be controlled manually to fly along a flight path above a road surface that would be driven by a professionally-driven ground vehicle. The UAV programming flight may be used to establish, confirm and/or adjust elements such as the spatial coordinates of the predetermined flight path. The UAV programming flight may be used to establish, confirm and/or adjust the values of various required UAV operating parameters (such as speed, direction, and altitude) and associated control commands needed to implement the required operating parameters and produce the desired UAV actions at all locations along the flight path. For example, the programming flight may establish when, where, and how much to accelerate and decelerate the UAV 101 at various locations along the test track, locations where turns are to be initiated, the speeds at which turns are to be performed, and operating parameters relating to other actions to be performed by the UAV 101 during a driver training event to facilitate instruction of a driver in a vehicle following behind the UAV. Information implemented and/or gathered during the UAV programming flight may be recorded, processed and correlated or associated with the spatial coordinates defining the predetermined flight path and incorporated into the UAV control module to aid in guiding the UAV during a driver training event. This may enable communication of appropriate driving instruction information to the driver-in-training in accordance with the current location of the training vehicle on the test track. The UAV programming flight may also be used to determine and/or store any other information needed to control the UAV 101 so as to provide a desired driver training experience. Alternatively, some or all of the information used to formulate the predetermined flight path and the UAV control commands to be executed along the predetermined flight path may be derived from sources such as data and/or other information gathered during a prior traversal of the test track by a professional driver or by the driver-in-training, without the presence of a UAV. This information may be also be recorded, processed and correlated with the spatial coordinates defining the predetermined flight path and incorporated into the UAV control module to aid in guiding the UAV during a driver training event. The predetermined flight path PP1 may be stored in a memory of the UAV 101. The UAV control module 160 may be configured to control the UAV 101 to execute the predetermined flight path PP1 and implement the UAV control functions associated with the predetermined flight path during a subsequent driver training event conducted on the test track.

As previously described, the UAV control module 160 may include computer-readable instructions that, when executed by the processor(s) 110, cause the processor(s) 110 to control operation of a driver training interface 116 operably connected to the UAV 101 to communicate driving instruction information in a manner configured to be perceptible by a human driver driving a training vehicle following behind the UAV.

The UAV control module 160 may include computer-readable instructions that, when executed by the processor(s) 110, cause the processor(s) to control operation of the UAV 101 during flight so as to maintain an altitude of the UAV within a predetermined range. An altitude of the UAV 101 may be a distance D1 (as shown in FIGS. 2B, 3B, 4B) of some reference feature of the UAV 101 above a road or ground surface RS1 on which the driver training vehicle 99 resides. The UAV altitude may be determined from sensor data. The predetermined altitude range of the UAV 101 may be specified so as to facilitate clear visual observation and tracking of the UAV by a driver-in-training during traversal of the test track, while also minimizing a risk of collision between the vehicle 99 and the UAV 101. In particular arrangements, the predetermined altitude range of the UAV is 2.5-4 feet inclusive.

Referring to FIG. 3A, the UAV control module 160 may include computer-readable instructions that, when executed by the processor(s) 110, cause the processor(s) to control operation of the UAV 101 during flight so as to maintain the UAV 101 within a predetermined lead distance range in front of the driver training vehicle while the training vehicle is following behind the UAV. A lead distance LR1 of the UAV 101 in front of the driver training vehicle 99 may be a distance between a vertical plane FP1 passing through a forward-most portion of the training vehicle 99 and extending perpendicular to a fore-aft axis FA1 of the training vehicle, and a reference feature located on the UAV 101. The lead distance of the UAV 101 may be determined from sensor data. The predetermined lead distance range of the UAV 101 may be a range of lead distances specified so as to facilitate clear visual observation and tracking of the UAV 101 by a driver-in-training during traversal of the test track, while also minimizing a risk of collision between the vehicle 99 and the UAV 101 during movement of the vehicle 99 and UAV 101 along the test track. In particular arrangements, the predetermined lead distance range of the UAV is 5-8 feet inclusive.

Referring to FIGS. 2A-2B, in one or more arrangements, multiple UAV's may be used to aid in training a driver on the test track. In such arrangements, the driver training system 100 may include at least a second UAV 201 in addition to the UAV 101. In one or more arrangements, any additional UAV's of the system 100 may be configured similarly to the UAV 101 as described herein. In arrangements where multiple UAV's are used for driver training, the multiple UAV's may be controlled so as to fly in any of a variety of specific spatial arrangements or formations during traversal of the test track.

Referring to FIGS. 1B and 2A-2B, the second UAV 201 may have a second UAV control module 260 including computer-readable instructions that when executed by the processor(s) 110 cause the processor(s) to control operation of the second UAV so as to maintain a predetermined spatial relationship of the second UAV 201 with respect to the UAV 101 during flight of the second UAV 201 and the UAV 101. As shown in FIG. 2A, the predetermined spatial relationship of the second UAV with respect to the UAV 101 may require that the second UAV 201 be positioned and maintained during flight at a distance DS1 specified so that the UAV's 101, 201, in combination, simulate the rear end of a ground vehicle leading the driver training vehicle along the test track as previously described.

The second UAV 201 may also have a driver training interface 216 operably connected thereto. Similar to the previously-described driver training interface 116, the driver training interface 216 may be configured to communicate driving instruction information in a manner configured to be perceptible by the human driver. The driver training interface 216 may have any of the forms previously described with respect to driver training interface 116. In the particular arrangement shown in FIG. 2A, UAV's 101 and 201 each include a lighting system 116-1 as previously described, with each interface simulating respective turn signals and brake lights of the ground vehicle.

The second UAV control module 260 may include computer-readable instructions that when executed by the processor(s) 110 cause the processor(s) to control operation of the second UAV 201 so as to implement a predetermined flight path PP2 of the second UAV 201 during flight of the second UAV 201 and the UAV 101 (i.e., so as to guide the second UAV along a flight path of the second UAV 201). The predetermined flight path PP2 of the second UAV 201 may be determined using any suitable method. In one or more arrangements, the second UAV control module 260 may be configured to generate the flight path of the second UAV 201. For example, the second UAV control module 260 may include computer-readable instructions that when executed by the processor(s) 110 cause the processor(s) to, based on the predetermined flight path PP1 of the UAV 101, generate a predetermined flight path PP2 of the second UAV 201. The flight path PP2 may be directed to maintaining the predetermined spatial relationship between the second UAV 201 and the UAV 101 during flight of the second UAV 201 and the UAV 101. The second UAV control module 260 may be configured to, using the known spatial coordinates of points along the flight path PP1 and the predetermined spatial relationship to be maintained between the UAV 101 and the second UAV 201, generate a flight path PP2 for the second UAV 201 which is spatially "offset" from the flight path PP1 so that each location along the flight path PP2 is in the predetermined spatial relationship with an associated location along the flight path PP1. In such arrangements, the flight path PP2 may be parallel to the flight path PP1.

In particular arrangements, and as shown in FIG. 2A-2B, the predetermined spatial relationship between UAV's 101 and 201 comprises a position of the second UAV 201 that is spaced apart a first predetermined distance DS1 from the UAV 101 along a vertical plane V1 extending through the UAV 101 and perpendicular to the predetermined flight path PP1 of the UAV 101 at a current position of the UAV 101, and an altitude of the second UAV 201 equal to an altitude D1 of the UAV 101 above the road surface RS1. In this manner, the pair of UAV's 101 and 201 may be controlled in flight so as to simulate the rear portion of a ground vehicle traveling in front of the driver training vehicle 99 for training purposes. The second UAV control module 260 may be configured to use sensor data to make minor corrections to the position of the second UAV 201 as it travels along the flight path PP2, so that the predetermined spatial relationship between UAV's 101 and 201 is maintained within an acceptable tolerance level.

In an additional UAV (such as second UAV 201) incorporating a driver training interface, the associated UAV control module (e.g., second control module 260) may also include computer-readable instructions that when executed by the processor(s) 110 cause the processor(s) to control operation of the driver training interface.

Figure 4A:
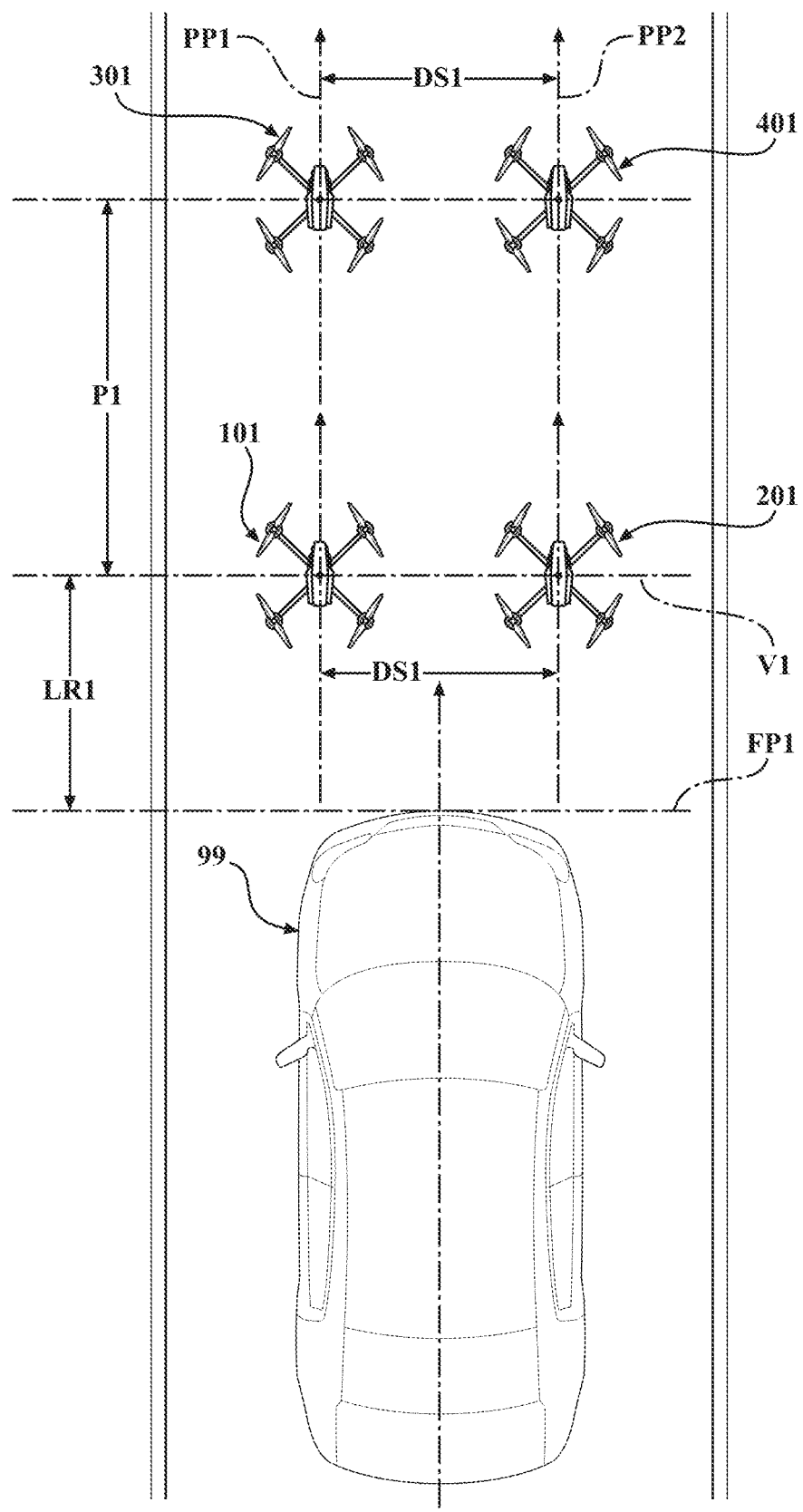
FIG. 4A is a schematic plan view of yet another embodiment of the driver training system incorporating multiple UAV's and flying above a road surface, with a driver training vehicle following the driver training system.
Figure 4B:
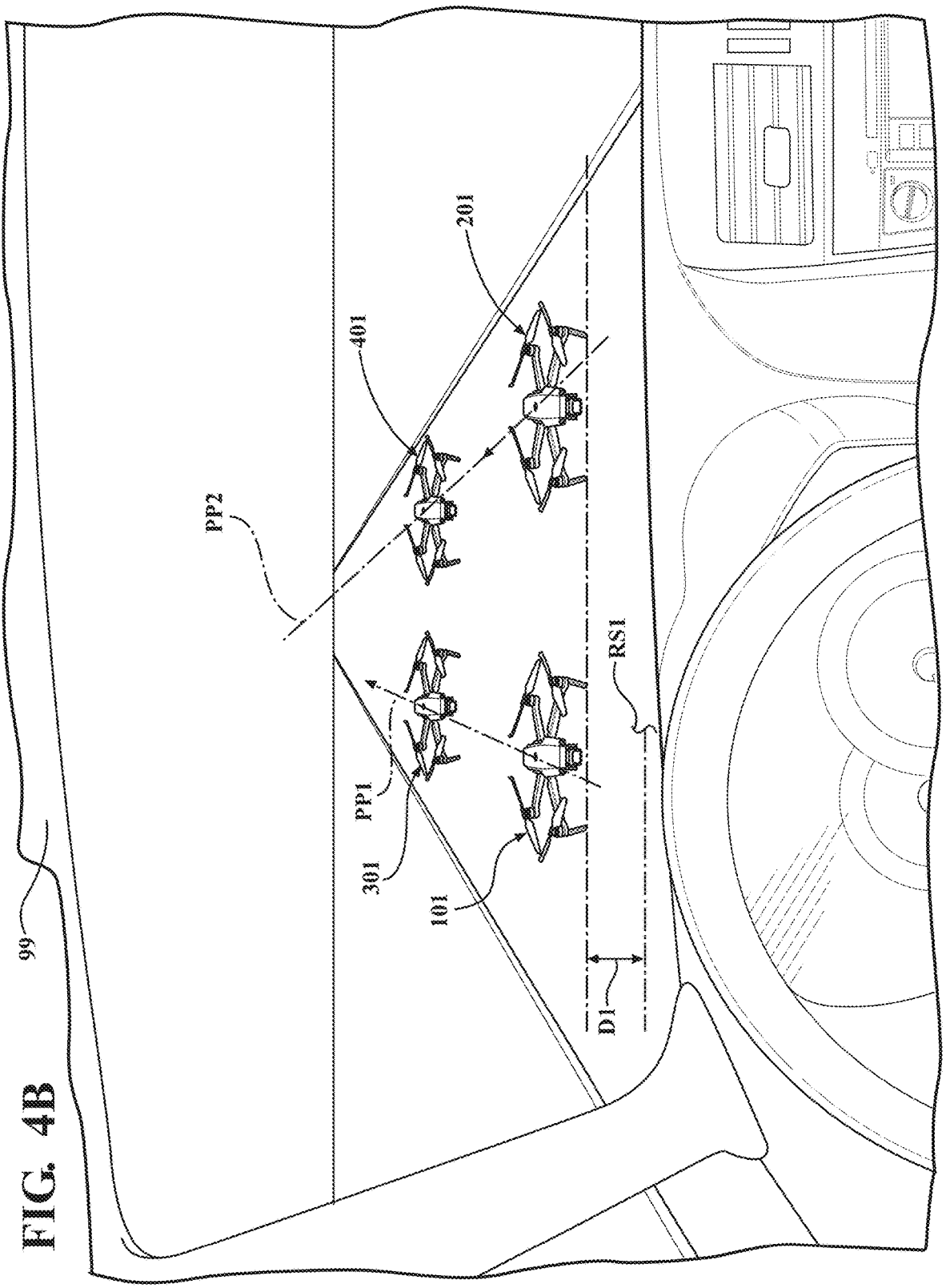
FIG. 4B is a schematic perspective view of the driver training system embodiment of FIG. 4A, seen from an occupant compartment of the driver training vehicle.

Referring now to FIGS. 1B and 4A-4B, in additional arrangements, the driver training system may include a third UAV 301 and a fourth UAV 401. UAV's 301 and 401 may be controllable so as to fly in a formation with respect to UAV's 101 and 201 such that the UAV's 101 and 201 simulate a rear end or respective rear road wheels of a ground vehicle driving in front of the driver training vehicle 99, while the UAV's 301 and 401 simulate a front end or respective front road wheels of the leading ground vehicle.

Third UAV 301 may have a third UAV control module 360 including computer-readable instructions that when executed by the processor(s) 110 cause the processor(s) to control the third UAV 301 so as to maintain the third UAV 301 in a predetermined spatial relationship with respect to the UAV 101 during flight of the third UAV 301 and the UAV 101. Third UAV 301 may have the predetermined flight path PP1 of the UAV 101 stored in memory. Based on the flight path PP1 and the known desired predetermined spatial relationship of the UAV 301 with respect to the UAV 101, the third UAV control module 360 may determine and implement UAV control commands necessary to control operation of the third UAV 301 to maintain the desired predetermined spatial relationship during flight of the UAV's 101, 301. Referring to FIGS. 4A-4B, in one or more arrangements, the predetermined spatial relationship of the third UAV 301 with respect to the UAV 101 may be a position of the third UAV 301 located at a predetermined distance P1 ahead of the UAV 101 and taken along the predetermined flight path PP1 of the UAV 101, and at the same altitude D1 as the UAV 101.

Fourth UAV 401 may have a fourth UAV control module 460 including computer-readable instructions that when executed by the processor cause the processor to control operation of the fourth UAV 401 so as to maintain the fourth UAV in a predetermined spatial relationship with respect to the second UAV 201 during flight of the fourth UAV 401 and the second UAV 201. Fourth UAV 401 may have the predetermined flight path PP2 of the second UAV 201 stored in memory. Based on the flight path PP2 and the known desired predetermined spatial relationship of the fourth UAV 401 with respect to the second UAV 201, the fourth UAV control module 460 may determine and implement UAV control commands necessary to control operation of the fourth UAV 401 to maintain the desired predetermined spatial relationship during flight of the UAV's 201, 401. Referring to FIGS. 4A-4B, in one or more arrangements, the predetermined spatial relationship of the fourth UAV 401 with respect to the second UAV 201 may be a position of the fourth UAV 401 located at a predetermined distance P1 ahead of the second UAV and taken along a predetermined flight path PP2 of the second UAV 201, and at the same altitude as the second UAV 201. In the positions just described, the third UAV 301 may simulate a left front portion or left front road wheel of a ground vehicle riding ahead of the driver training vehicle 99, and the fourth UAV 401 may simulate a right front portion or right front road wheel of the ground vehicle.

In further aspects of the embodiments described herein, a non-transitory computer-readable medium is provided for training a driver to drive a ground vehicle. The non-transitory computer-readable medium may store instructions that when executed by a processor cause the processor to, in an unmanned aerial vehicle (UAV) configured to fly along a predetermined flight path extending above a road surface on which the ground vehicle resides, control operation of a driver training interface operably connected to the UAV such that the driver training interface communicates driving instruction information in a manner configured to be perceptible by the driver when the driver is following behind the UAV in the ground vehicle as the UAV flies along the predetermined flight path. In some arrangements, the driver training interface may comprise a lighting system structured to simulate operation of a brake light and a rear turn signal of a ground vehicle, and the non-transitory computer-readable medium may store instructions that when executed by a processor cause the processor to control the driver training interface to simulate operation of the lighting system to simulate a brake light and a rear turn signal of a ground vehicle responsive to one or more control commands. In some arrangements, the non-transitory computer-readable medium may store instructions that when executed by a processor cause the processor to control operation of the UAV during flight so as to maintain an altitude of the UAV within a predetermined range, and so as to maintain the UAV within a predetermined lead distance range in front of the ground vehicle while the ground vehicle is following behind the UAV.

In yet further aspects of the embodiments described herein, a method for training a driver to drive a ground vehicle is provided. The method may include a step of, in an unmanned aerial vehicle (UAV) configured to fly along a predetermined flight path extending above a road surface on which the ground vehicle resides, the UAV having a driver training interface operably connected thereto, controlling operation of the driver training interface to communicate driving instruction information in a manner configured to be perceptible by the driver when the driver is following behind the UAV in the ground vehicle as the UAV flies along the predetermined flight path. In some arrangements, the method may further include steps of maintaining an altitude of the UAV within a predetermined range while the ground vehicle is following behind the UAV, and maintaining the UAV within a predetermined lead distance range in front of the ground vehicle while the ground vehicle is following behind the UAV. In some arrangements, the method may further include a the step of controlling operation of a second UAV having a second driver training interface operably connected thereto so as to communicate driving instruction information in a manner configured to be perceptible by the driver when the driver is following behind the second UAV in the ground vehicle as the second UAV flies along a second predetermined flight path.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for controlling operation of a rear-facing, light-emitting driver training interface physically attached to an unmanned aerial vehicle (UAV), the system comprising:
a processor; and
a memory communicably coupled to the processor and storing a UAV control module including computer-readable instructions that when executed by the processor cause the processor to control operation of the interface to display driving instruction information as the UAV moves along a flight path.

2. The system of claim 1 wherein the driver training interface comprises a lighting system structured to simulate operation of a brake light and a rear turn signal of a ground vehicle responsive to one or more control commands.

3. The system of claim 1, wherein the driver training interface comprises a rear light carrier.

4. The system of claim 1, wherein the driver training interface comprises a command display.

5. The system of claim 4 wherein the command display includes an accelerator portion configured to provide a visual indication of a need to operate an accelerator pedal of the driver training vehicle, and wherein the UAV control module includes computer-readable instructions that when executed by the processor cause the processor to control operation of the command display to illuminate the accelerator portion responsive to a requirement to accelerate the training vehicle.

6. The system of claim 4 wherein the command display includes a braking portion structured to provide a visual indication of a need to operate a brake of the driver training vehicle, and wherein the UAV control module includes computer-readable instructions that when executed by the processor cause the processor to control operation of the command display to illuminate the braking portion responsive to a requirement to slow the driver training vehicle.

7. The system of claim 4 wherein the command display includes a steering portion structured to provide a visual indication of a need to operate a steering wheel of the driver training vehicle, wherein the UAV control module includes computer-readable instructions that when executed by the processor cause the processor to control operation of the command display to display a status bar spaced apart a distance from a centerline of the steering portion and along any of a first side and a second side of the centerline responsive to a requirement to turn the driver training vehicle, and wherein a side of the centerline along which the status bar is displayed indicates a direction in which the steering wheel is to be turned.

8. The system of claim 1, wherein the UAV control module includes computer-readable instructions that, when executed by the processor, cause the processor to control operation of the UAV during flight so as to maintain an altitude of the UAV within a predetermined range, and so as to maintain the UAV within a predetermined lead distance range in front of the driver training vehicle while the driver training vehicle is following the UAV.

9. The system of claim 1, further comprising a second UAV control module including computer-readable instructions that when executed by the processor cause the processor to control operation of a second UAV so as to maintain a predetermined spatial relationship of the second UAV with respect to the UAV during flight of the second UAV and the UAV.

10. The system of claim 9, wherein the second UAV control module includes computer-readable instructions that when executed by the processor cause the processor to:

based on to a predetermined flight path of the UAV, generate a predetermined flight path of the second UAV directed to maintaining the predetermined spatial relationship of the second UAV with respect to the UAV during flight of the second UAV and the UAV; and control operation of the second UAV so as to implement the predetermined flight path of the second UAV during flight of the second UAV and the UAV.

11. The system of claim 9 wherein the second UAV control module includes computer-readable instructions that when executed by the processor cause the processor to control operation of a driver training interface operably connected to the second UAV and configured to communicate driving instruction information in a manner configured to be perceptible by the human driver.

12. The system of claim 9 wherein the predetermined spatial relationship of the second UAV with respect to the UAV comprises a position of the second UAV that is spaced apart a predetermined distance from the UAV along a vertical plane extending through the UAV and perpendicular to a predetermined flight path of the UAV at a current position of the UAV, and an altitude of the second UAV equal to an altitude of the UAV.

13. The system of claim 12, further comprising a third UAV control module including computer-readable instructions that when executed by the processor cause the processor to control operation of a third UAV so as to maintain the third UAV in a predetermined spatial relationship with respect to the UAV during flight of the third UAV and the UAV, the predetermined spatial relationship of the third UAV with respect to the UAV including a position of the third UAV located at a predetermined distance ahead of the UAV and taken along a predetermined flight path of the UAV, and at a same altitude as the UAV.

14. The system of claim 13, further comprising a fourth UAV control module including computer-readable instructions that when executed by the processor cause the processor to control operation of a fourth UAV so as to maintain the fourth UAV in a predetermined spatial relationship with respect to the second UAV during flight of the fourth UAV and the second UAV, and wherein the predetermined spatial relationship of the fourth UAV with respect to the second UAV includes a position of the fourth UAV located at a predetermined distance ahead of the second UAV and taken along a predetermined flight path of the second UAV, and at a same altitude as the second UAV.

15. A non-transitory computer-readable medium storing instructions that when executed by a processor cause the processor to control operation of a rear-facing, light-emitting driver training interface physically attached to an unmanned aerial vehicle (UAV), to display driving instruction information as the UAV flies along a predetermined flight path.

16. The non-transitory computer-readable medium of claim 15, wherein the driver training interface comprises a lighting system structured to simulate operation of a brake light and a rear turn signal of a ground vehicle, and wherein the medium stores instructions that when executed by a processor cause the processor to control the driver training interface to simulate operation of the lighting system to simulate a brake light and a rear turn signal of a ground vehicle responsive to one or more control commands.

17. The non-transitory computer-readable medium of claim 15, wherein the medium stores instructions that when executed by a processor cause the processor to control operation of the UAV during flight so as to maintain an altitude of the UAV within a predetermined range, and so as to maintain the UAV within a predetermined lead distance range in front of the ground vehicle while the ground vehicle is following behind the UAV.

18. A method for controlling a rear-facing, light-emitting driver training interface physically attached to an unmanned aerial vehicle (UAV) the method comprising a step of controlling operation of the interface to display driving instruction information as the UAV flies along a predetermined flight path.

19. The method of claim 18, further comprising steps of:
maintaining an altitude of the UAV within a predetermined range while the ground vehicle is following behind the UAV; and
maintaining the UAV within a predetermined lead distance range in front of the ground vehicle while the ground vehicle is following behind the UAV.

20. The method of claim 18, further comprising the step of controlling operation of a second UAV having a second driver training interface operably connected thereto so as to communicate driving instruction information in a manner configured to be perceptible by the driver when the driver is following behind the second UAV in the ground vehicle as the second UAV flies along a second predetermined flight path.

* * * * *